United States Patent
Balan

(10) Patent No.: US 7,377,689 B2
(45) Date of Patent: May 27, 2008

(54) TRANSFORMER TEMPERATURE MONITORING AND CONTROL

(75) Inventor: Todd-Michael Balan, Rochester, NY (US)

(73) Assignee: Qualitrol Corporation, Fairport, NY (US)

( * ) Notice: Subject to any disclaimer, the term of this patent is extended or adjusted under 35 U.S.C. 154(b) by 316 days.

(21) Appl. No.: 11/216,760

(22) Filed: Aug. 31, 2005

(65) Prior Publication Data

US 2006/0250683 A1    Nov. 9, 2006

Related U.S. Application Data

(60) Provisional application No. 60/678,294, filed on May 6, 2005.

(51) Int. Cl.
*G01K 1/08* (2006.01)
*G01K 7/00* (2006.01)

(52) U.S. Cl. .............. 374/152; 73/866.5; 374/161

(58) Field of Classification Search ........... 374/100, 374/141, 142, 152, 161; 73/866.5
See application file for complete search history.

(56) References Cited

U.S. PATENT DOCUMENTS

| | | | |
|---|---|---|---|
| 3,960,017 A * | 6/1976 | Romanowski | 374/152 |
| 4,036,058 A * | 7/1977 | Bodker | 374/152 |
| 4,136,566 A | 1/1979 | Christensen | |
| 4,151,747 A | 5/1979 | Gottlieb et al. | |
| 4,179,927 A * | 12/1979 | Saaski | 374/152 |
| 4,215,275 A | 7/1980 | Wickersheim | |
| 4,278,349 A | 7/1981 | Sander | |
| 4,307,607 A * | 12/1981 | Saaski et al. | 374/161 |
| 4,316,388 A * | 2/1982 | Miller et al. | 374/161 |
| 4,362,057 A | 12/1982 | Gottlieb et al. | |
| 4,448,547 A | 5/1984 | Wickersheim | |
| 4,708,494 A * | 11/1987 | Kleinerman | 374/161 |
| 4,827,487 A * | 5/1989 | Twerdochlib | 374/152 |
| 4,863,280 A * | 9/1989 | Doemens | 374/119 |
| 5,651,175 A | 7/1997 | Grimes et al. | |

(Continued)

FOREIGN PATENT DOCUMENTS

JP        03161911 A      7/1991

OTHER PUBLICATIONS

"Optical Fiber Technology", Intelligent Wells, Oct. 2002, USA.

(Continued)

*Primary Examiner*—Thuy Vinh Tran
(74) *Attorney, Agent, or Firm*—Douglas J. Ryder; Ryder IP Law, PC

(57) ABSTRACT

According to one embodiment an apparatus to monitor the temperature of a transformer is disclosed. The apparatus includes a fiber optic cable having a temperature sensing probe on one end embedded in windings of a transformer. An optical converter transmits light to the probe and receives light from the probe, and converts the light received to an electrical signal. The light received back from the probe is controlled by temperature of the probe. Monitors are used to monitor different parameters of the transformer. A controller generates a simulated winding temperature based on data received from the monitors and converts the electrical signal to a direct winding temperature. The controller analyzes the operation of the transformer by comparing the direct winding temperature to the simulated winding temperature. Other embodiments are disclosed herein.

20 Claims, 18 Drawing Sheets

U.S. PATENT DOCUMENTS

| | | | |
|---|---|---|---|
| 6,424,266 B1 * | 7/2002 | Weekes et al. | 340/588 |
| 6,727,821 B2 * | 4/2004 | Weekes et al. | 340/588 |
| 6,888,124 B1 | 5/2005 | Smith | |
| 7,077,566 B2 | 7/2006 | Rajendran et al. | |
| 2005/0013342 A1 | 1/2005 | Kaminski et al. | |
| 2006/0215730 A1 * | 9/2006 | Meilleur et al. | 374/152 |
| 2006/0251147 A1 | 11/2006 | Balan | |

OTHER PUBLICATIONS

"Fiso Technologies—Fiber Option Temperature Monitoring Solution", Power Technology Website, printed Feb. 15, 2004.

Ivan Melnyk, Derek Montgomery & Doug Short, "Transformer Protection", Electrical Business, Dec. 2003,USA, p. 5.

Tony Pink, Peter Stewart, "Power Transformer Control Systems Developments", Tech Con 2004, North America.

"Pyre ML Wire Enamel" Industrial Summit Technology Technical Bulletin #MIL-1-95, Mar. 1, 2005, IST, Parlin, NJ.

"Pyre ML Insulating Varnish" Industrial Summit Technology Technical Bulletin, #MIL-2-95, Mar. 1, 2005, IST, Parlin, NJ.

"Pyre ML Liquid 'H' Enamel" Industrial Summit Technology Technical Bulletin, #MIL-3-95, Mar. 1, 2005, IST, Parlin, NJ.

"Luxtron Introduces Next Gen Fiber Optic Feedthrough for Leak Fee Connection", press release, Luxtron, Nov. 15, 2004, Santa Clara, California USA.

"Temperature Prober Installation Success Rate Increases Two Fold", press relaease, Luxtron, Dec. 1, 2004, Santa Clara, California USA.

"A Reference Guide to Optical Fibers & Light Guides" Phonton Technology International Website, printed Jun. 15, 2005.

SW Allison, Mr Cates. GT Cillies, "Excitation of Thermographic Phosphors Using a Blue LED, Spectral Characteristics & Instrumental Applications", Oak Ridge Nat'l Laboratory Oak Ridge, TN & Dept of Mechanical & Aerospace Engineering, University of Virginia, Charlottesville, VA, exact publication date unknown, assume at least as early as Jul. 2004.

"Monitoring of Power Transformer Winding Temperture Using Robust Fiber Optic Sensing System", Luxtron WTS Series, product notes, pp. 1-5, Luxtron Corp, USA, exact publication date unknown, assume at least as early as Jul. 2004.

"FISO's Nortech Fiber Optic Direct Winding Temperature Measurement System for High Voltage Transformers", FISO Technology, technical notes, FISO, Canada, exact publication date unknown, assume at least as early as Jul. 2004.

ATS 350/650 Fiber Optic Temperature Sensor/Transmitor System Description, FISO, Canada, May 1, 2003.

ATS HST Winding Hot Spot Temperature Measurement System, Photon Control, product description, Photon Control, Canada, Jun. 16, 2003.

Ahmed Glodjo, Ron Mueller, Michael Brown, Sharon Walsh, "Field Experience w/ Multipoint, Internal Temperature Measurement of Converter Transformers", Doble Engineering Company, 2004 - exact publication date unknown, assume at least as early as Jul. 2004.

"Finally Fiber Optic Sensing of Power Transformer Winding Hotspots is Paying Off", Luxtron Corp, USA, exact publication date unknown, assume at least as early as Jul. 2004.

WTS Series Product Notes, "Fluoroptic vs. Semiconductor Absorption Edge", Luxtron Corp, USA, exact publication date unknown, assume at least as early as Jul. 2004.

WTS Series Product Notes, "Luxtron's WTS Fiber Optic Winding Temperature Sensors", Luxtron Corp, USA, exact publication date unknown, assume at least as early as Jul. 2004.

WTS-22, " Fiber Optic Transformer Winding Temperature Measurement" product description, Luxtron Corp, USA, exact publication date unknown, assume at least as early as Jul. 2004.

M600 "Floroptic Thermometers" product description, Luxtron Corp, USA, Oct. 2002.

"Thermasset Monitor" product description, Luxtron Corp, USA, Mar. 2004.

WTS-11 Fluoroptic Thermometer "Fiberoptic Transformer Winding Temperature Monitor" product description, Luxtron Corp, USA, exact publication date unknown, assume at least as early as Jul. 2004.

WTS Series product notes "End User Benefit of Winding Hot Spot Temperature Measurement" and purchaser specification, Luxtron Corp, USA, exact publication date unknown, assume at least as early as Jul. 2004.

WTS Series product notes "Ruggedized Transformer Probes" Luxtron Corp, USA, Mar. 2004.

"Fiber Optic Sensors" FISO product description, FISO Canada, exact publication date unknown, assume at least as early as Jul. 2004.

"FISO Easythrough Optical Tank Wall Penetrator", FISO product description, FISO Canada, exact publication date unknown, assume at least as early as Jul. 2004.

"FISO patchcord" FISO product description, FISO, Canada, exact publication date unknown, assume at least as early as Jul. 2004.

"TPT-32 Fiber Optic Temperature Sensor" FISO product description, FISO, Canada, exact publication date unknown, assume at least as early as Jul. 2004.

"Nortech Commander Software", FISO product description, FISO, Canada, exact publication date unknown, assume at least as early as Jul. 2004.

"Nortech Optical Conditioner", FISO product description, FISO, Canada, exact publication date unknown, assume at least as early as Jul. 2004.

Fiber Optic Signal Conditioners Product Catalog, FISO Canada, exact publication date unknown, assume at least as early as Jul. 2004.

Fiber Optic Temperature Sensors Installation Guide, FISO Canada, Nov. 25, 2002.

Ocean Optics CAtalog, pp. 112-113, 134-135, Ocean Optics, Dunedin, FL, USA, 2004 - exact publication date unknown, assume at least as early as Jul. 2004.

"Fiber Optic Transformer Winding Temperature Control Purchase Specifications",Luxtron Corp, USA, exact publication date unknown, assume at least as early as Jul. 2004.

"Installation Instructions",Luxtron Corp, USA, 2004 - exact publication date unknown, assume at least as early as Jul. 2004.

"The value of Fluoroptic Thermometry",Luxtron Corp, USA, exact publication date unknown, assume at least as early as Jul. 2004.

Wickersheim, "Application of Fiber Optic Thermometry to the Monitoring of Winding Temperatures in Medium and large Power Transformers", SPIE Optic laser Sensors IX, vol. 1584, 1991.

McNutt et al., "Direct Measurement of Transformer Winding Hot Spot Temperature", IEEE Transactions on Power Apparatus and Systems, vol. PAS-103, No. 6, pp. 1155-1162, Jun. 1984.

* cited by examiner

TRANSFORMER TEMPERATURE MONITORING AND CONTROL

PRIORITY

This application claims the priority under 35 USC §119 of Provisional Application 60/678,294 entitled "Transformer Temperature Monitoring And Control" filed on May 6, 2005 and having Todd-Michael Balan as an inventor (Attorney Docket number QUA-001). Application 60/678,294 is herein incorporated by reference in its entirety but is not prior art.

BACKGROUND

Transformers are utilized in power transmission and distribution systems to modify the voltage of the power being provided. Being able to monitor and analyze various attributes about the transformer is critical for maintenance and troubleshooting as well as for proper and/or optimum loading. Various techniques are used to track the parameters of the transformer. Thermal stresses are a major factor in determining the lifespan of transformers. The operating temperature of the transformer has a major influence on aging of the insulation of the windings of the transformer.

Accordingly, there is a need to know the temperature (e.g., hot spot temperature) of the windings. The temperature of the windings may be simulated by measuring the temperature of the top oil of the transformer and then simulating the temperature increase for the hot spot. The temperature of the top oil may be measured using a capillary thermometer and a small heater may be used to simulate the temperature rise of the winding hot spot. Current from one of the bushings of the transformer is passed through the heater in order to raise the measured temperature. The heater requires calibration to remain accurate and is known to deteriorate with time. The capillary thermometer may provide a fairly accurate simulation of the hot spot temperature (e.g., within 2-3 degrees C.). However, for changes in temperature (e.g., increases) the capillary thermometer may lag behind the actual winding temperature in recording the changes (e.g., take 4 hours to reach direct winding temperature).

Electronic temperature monitors (ETMs) can also be used to calculate the temperature of the windings. ETMs may use resistive thermal devices (RTDs) that are more accurate (e.g., within 0.2 degrees C.) to measure the top oil temperature. The additional temperature rise of the winding hot spot over the oil temperature is added digitally. The ETM has the ability to tune the time constant of the ETM to match the time constant of the transformer (can adjust for different loads and thermal transients). Advanced ETMs may be able covert the temperature data into information that can be used for loading and/or maintenance.

Both the simulated and calculated temperature measurements are only predictions of the winding hot spot temperature. The measurements are only as accurate as the calibration information used to predict the temperature. Moreover, any change that may cause the windings to run hotter may not be detected.

Fiber optic probes may be used to measure direct winding temperature. However, the fiber optic cables and probes may be fragile and break. Moreover, the light source often has a limited life cycle. Replacing the bulb may require recalibration with sophisticated equipment and possible return to the factory. In addition the light source and the optical system may need to be calibrated so that they stay aligned.

What is needed is a more robust and maintainable system for measuring the direct winding temperature. Additionally, a system is needed for analyzing both predicted and actual temperature measurements for maintenance and operational purposes.

SUMMARY

An apparatus is provided for measuring the temperature within the windings of a transformer by utilizing a fiber optic cable with a rugged temperature probe. According to one embodiment, a bundled fiber optic cable is utilized. The bundled cable is more flexible and has a better bend radius. In addition, the bundled cable provides redundancy as temperature measurements can still be made even if a portion of the fibers within the bundle is inoperable. Light is transmitted from a light source to the probe and the light returned is indicative of temperature. The light source may be a laser, a broadband light source or an LED, such as a blue LED.

According to one embodiment, the probe includes a phosphorous tip that emits an afterglow when excited by a light source. The afterglow may be a red fluorescent with the persistence of the afterglow based on temperature. A photodetector may be used to receive the afterglow and generate an electrical signal indicative of temperature based thereon.

According to one embodiment, the probe includes a crystal and a mirror, wherein the crystal absorbs different wavelengths of light received based on temperature and wavelengths of light not absorbed are reflected back by the mirror. A spectrometer may be used to receive the wavelengths of light from the mirror and generate an electrical signal indicative of temperature based thereon.

A controller may convert the electrical signals to actual winding temperature. In addition the controller may receive additional measurements regarding a transformer and display, record and/or analyze the measurements. The measurements may include top oil temperature and the controller may generate a simulated or calculated winding temperature. The controller may analyze the performance of the transformer by comparing the actual direct winding temperature to the simulated and/or calculated winding temperature.

BRIEF DESCRIPTION OF THE DRAWINGS

The features and advantages of the various embodiments will become apparent from the following detailed description in which.

DETAILED DESCRIPTION

Figure 1:
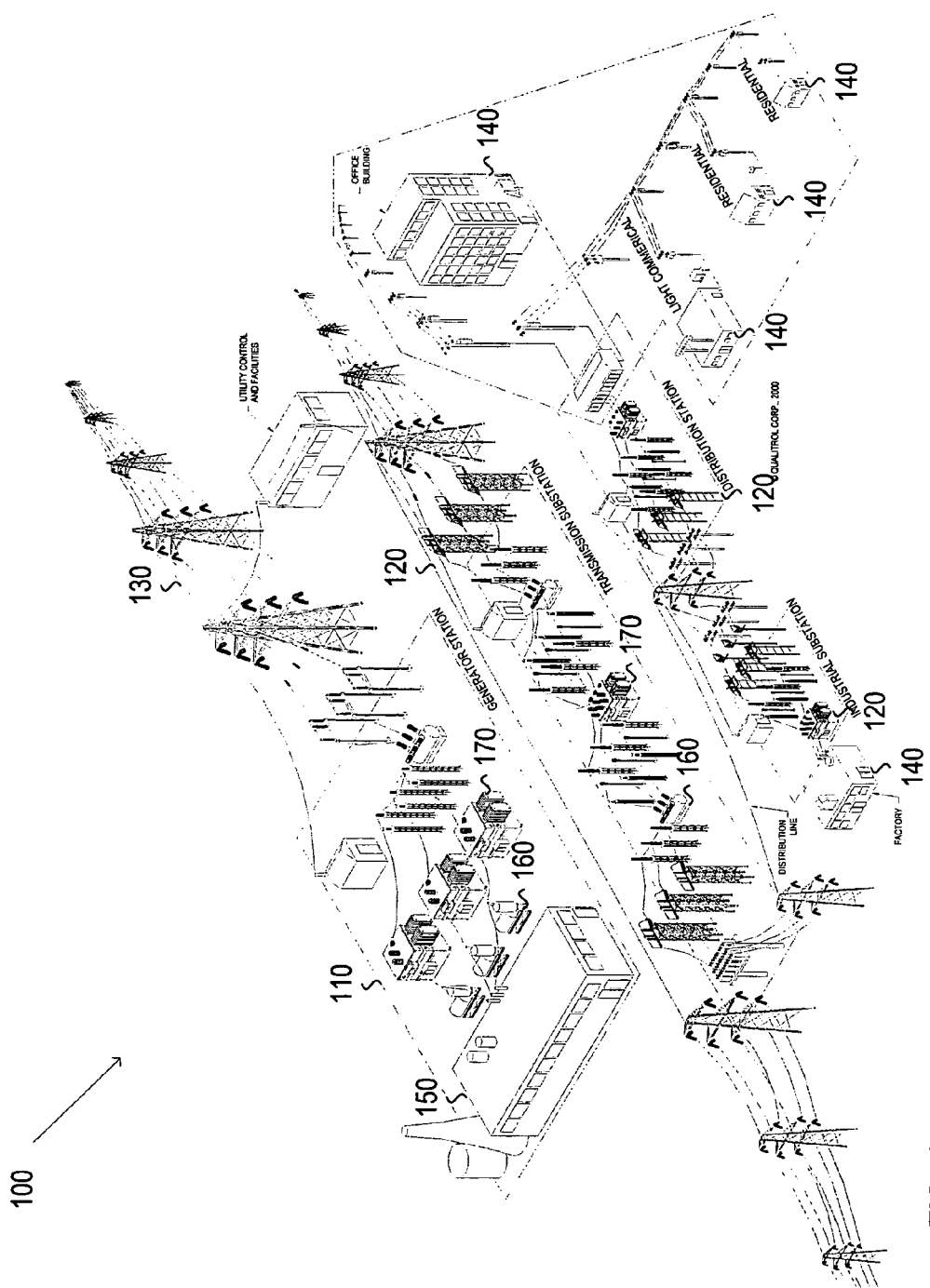
FIG. 1 illustrates an example power transmission and distribution system, according to one embodiment.

FIG. 1 illustrates an example of a power transmission and distribution system 100. The system 100 includes a generation station 110, substations 120 (e.g., transmission, industrial, distribution), transmission lines 130, and end users 140 (e.g., residential, commercial, office, factory). The generation station 110 includes a power plant 150, circuit breakers 160, transformers 170, as well as other equipment. The substations 120 also include circuit breakers 160, transformers 170, and other equipment (to a smaller scale). Transformers 170 may also be used in neighborhoods (smaller scale). The transformers 170 are used to step up or step down the voltage (and accordingly step down or up the current) depending on where the power is going. For example, the voltage may be stepped up (current stepped down) when the voltage is being transmitted over the transmission lines 130 and the voltage may be stepped down (and current stepped up) when the voltage is being provided to end users 140 (e.g., a residence).

Figure 2:
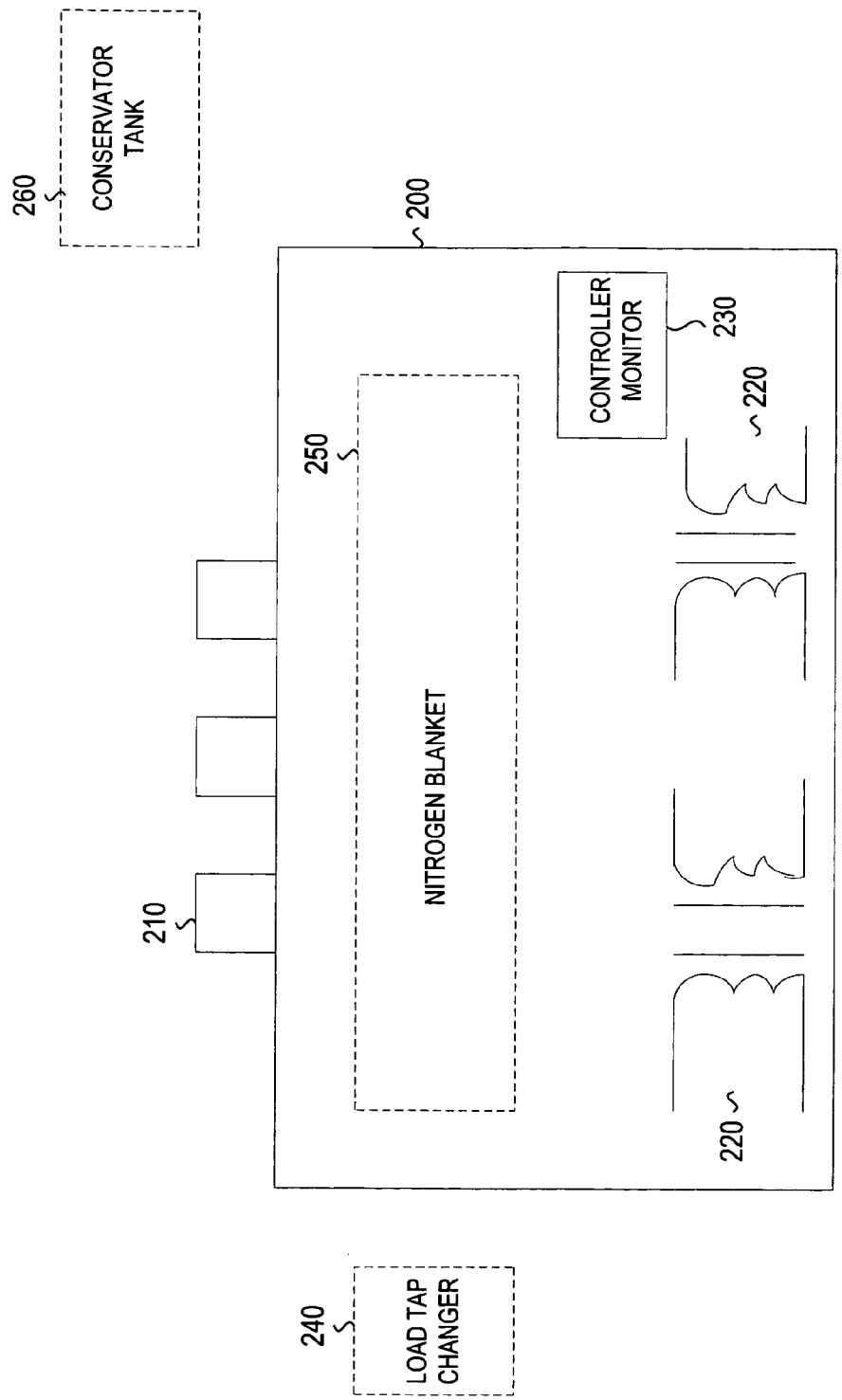
FIG. 2 illustrates a block diagram of an example transformer, according to one embodiment.

FIG. 2 illustrates a block diagram of an example transformer 200 (e.g., 170 of FIG. 1). The transformer 200 includes bushings 210, windings 220, and monitors/controllers 230. The bushings 210 receive/send power. The windings 220 modify the voltage (e.g., step up, step down). The monitors/controllers 230 monitor and/or control different aspects of the transformer 200. For example, the monitors/controllers 230 may monitor temperature, liquid levels, and pressure. The monitors/controllers 230 may simply measure and display different features on gauges or displays. Alternatively the monitors/controllers 230 may measure and analyze the features and may either propose certain actions be taken or may initiate certain actions.

The transformer 200 may be a fixed transformer in which the voltage is modified by the same ratio each and every time. Alternatively, the transformer 200 may include a load tap changer 240 that enables the ratio to be modified. If a load tap changer 240 is utilized the monitors/controllers 230 may include a load tap change controller and/or a tap position indicator.

The transformer 200 may be a dry transformer or may include oil or some other insulating liquid or gas. The transformer may include a nitrogen blanket 250 or may use a conservator tank 260 that is located external to the transformer 200.

Figure 3:
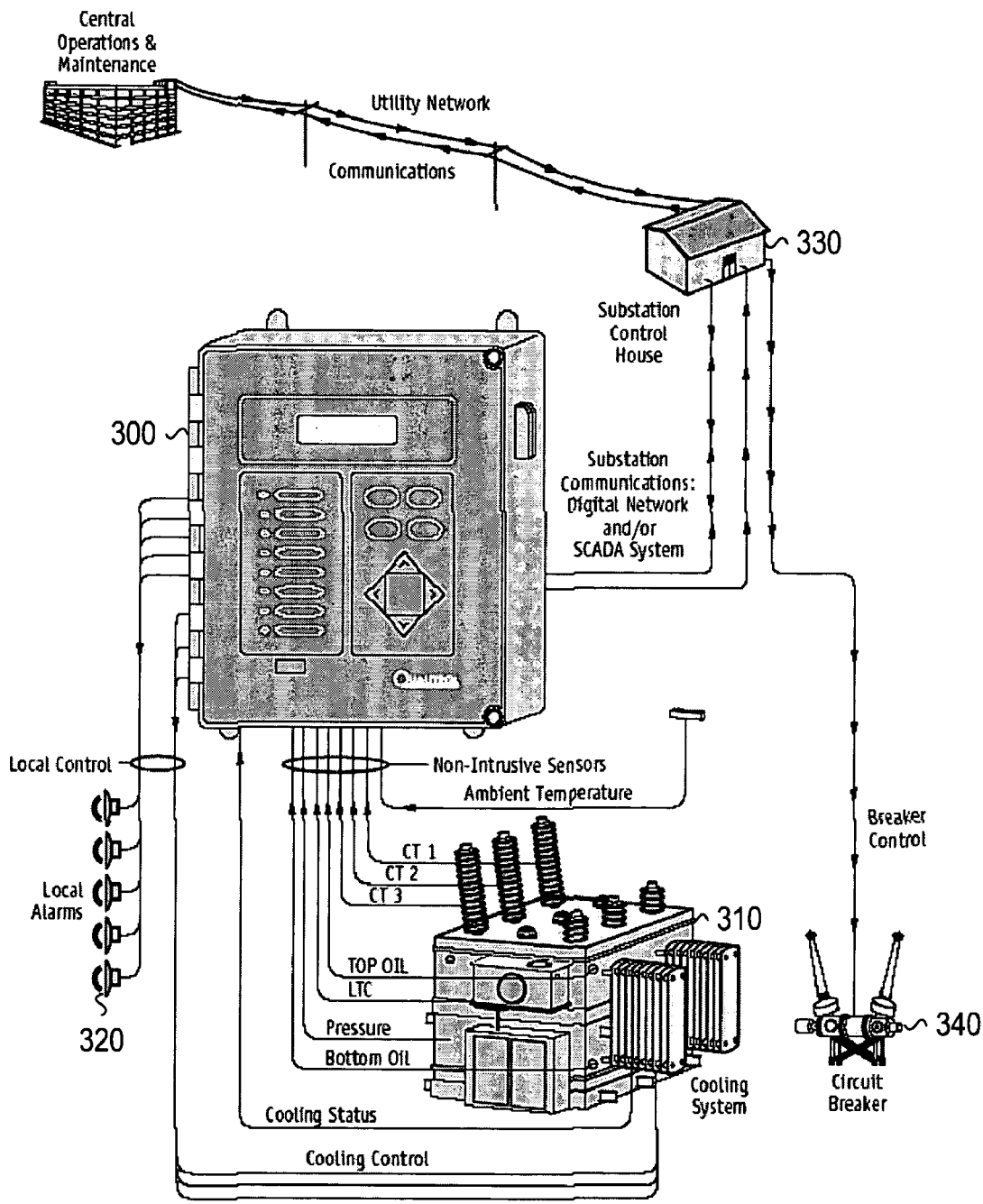
FIG. 3 illustrates an example controller receiving multiple monitored inputs from a transformer, according to one embodiment.

FIG. 3 illustrates an example connection of a controller 300 to a transformer 310 (e.g., 200 of FIG. 2). The controller 300 is used to monitor various transformer parameters. The controller 300 includes several connections to the transformer 310 for measuring/monitoring the different parameters. As illustrated, the parameters being monitored include ambient temperature, load current at the bushings, oil temperature above the windings (top oil), load tap control, pressure, oil temperature below the windings (bottom oil), cooling status and cooling control. The statuses being monitored may be displayed on the controller 300 via a plurality of lights and/or indicators, or may provide text or graphic depictions of the status. The controller 300 may also include audio and/or visual alarms 320 to indicate when a status needs the attention of an operator. The status may be recorded for later retrieval.

According to one embodiment, the controller 300 may provide an operator with a means for further examination and/or analyzing the status of one or more of the parameters being monitored or may provide the operator with a means for taking corrective or preventative action. The monitoring/analysis or alarm signals may be transmitted upstream (e.g., to a substation control house 330) for analysis and action. Actions that may be taken include tripping a circuit breaker 340, if necessary.

One important transformer parameter to monitor is the temperature of the windings. As discussed in the background, the temperature of the windings is important because thermal stresses are a major factor in determining the lifespan of transformers (aging of the winding insulation). The temperature of the winding may be simulated with a top oil thermometer and a heater. The winding temperature may be calculated using a top oil RTD and an algorithm (within the controller 300). The actual temperature of the windings (direct winding temperature) may be measured using a fiber optic probe embedded in the windings (discussed in more detail later).

Figure 4:
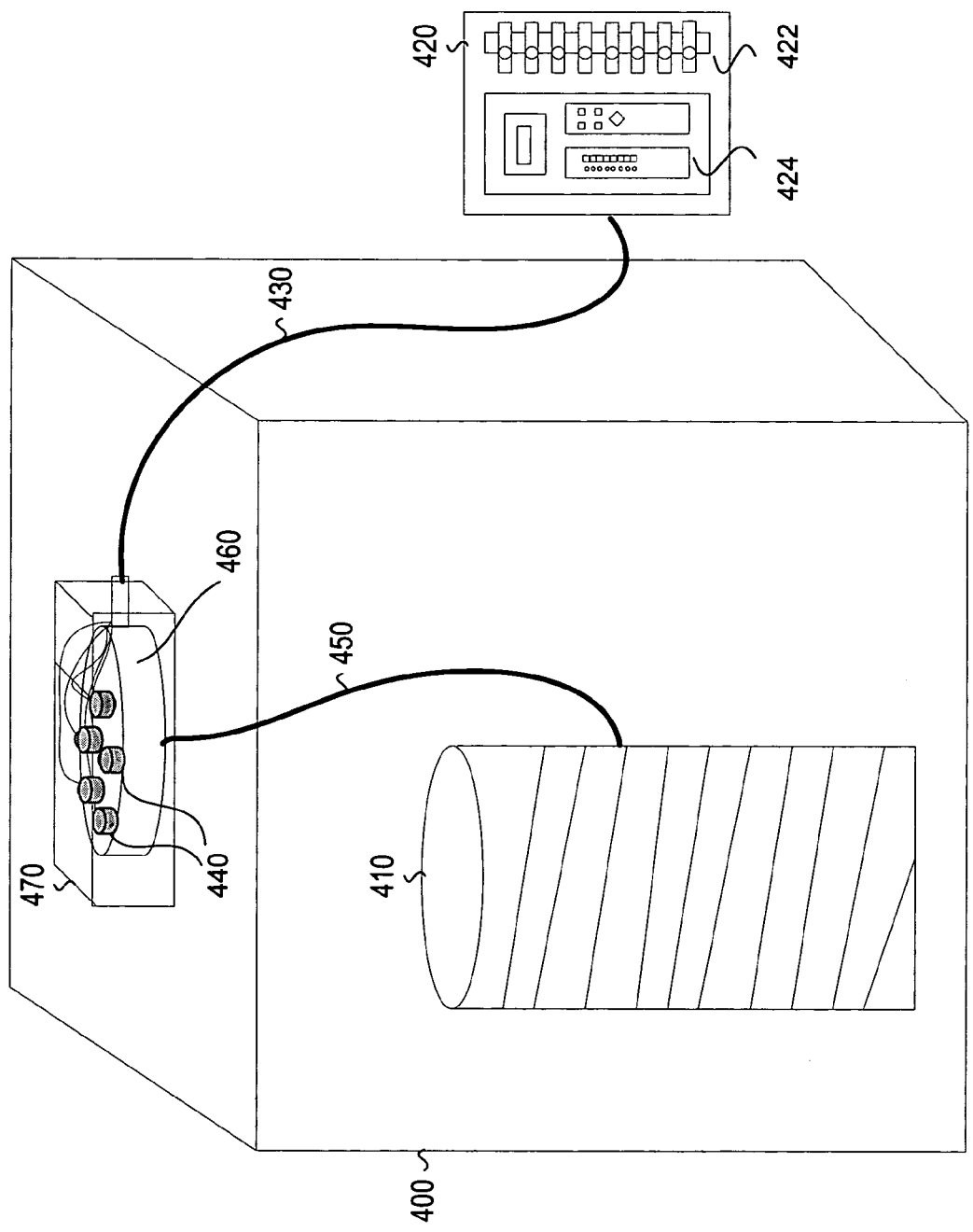
FIG. 4 illustrates an example transformer having the temperature of a winding monitored with a fiber optic cable and probe, according to one embodiment.

FIG. 4 illustrates an example transformer 400 measuring actual temperature of a winding 410 (direct winding temperature). A device 420 located external to the transformer 400 (mounted to the outside of the transformer 400) may send/receive optical signals and convert the optical signals from the windings to electrical signals (optical temperature sensor/transmitter 422) and associate the electrical signals with temperature (controller 424). According to one embodiment, the optical temperature sensor/transmitter 422 and the controller 424 may be located in separate devices electrically connected to one another. The controller 424 may simply receive the electrical signals from the optical temperature sensor/transmitter 422 and determine the direct winding temperature therefrom. Alternatively, the electrical signals from the optical temperature sensor/transmitter 422 may be but one of the signals that is received by the controller 424. For example, the controller 424 may receive the signals associated with the various parameters being monitored including top oil temperature that may be utilized to simulate and/or calculate the winding temperature. If the controller 424 receives both direct winding temperature and predicted winding temperature it may be programmed to perform additional diagnostics (discussed in more detail later).

A fiber optic cable (or cables) 430 carrying an optical signal is run from the device 420 to an entry point. The cable 430 may be run in a jacket along the exterior of the transformer 400 for protection. The entry point may be a feed-through connector 440 (sealed connector). The feed-through connector 440 connects the cable 430 that is external to the transformer 400 to a fiber optic cable 450 that is internal to the transformer 400. The fiber optic cable 450 includes a ruggedized temperature probe (not illustrated) embedded in the winding 410.

If the feed-through connector 440 is not adequately mounted to the transformer 400 it may lead to leakage in the transformer 400. According to one embodiment, the feed-through connecter 440 is mounted to a feed-through plate 460 and the feed-through plate 460 is then mounted to the transformer 400. Using the feed-through plate 460 in addition to the feed-through connector 440 provides an extra level of seal to prevent leakage. According to one embodiment, a feed-through assembly is provided that includes the feed-through connector 440 permanently connected to the feed-through plate 460 (e.g., welded). According to one embodiment, only the feed-through assembly is available to limit leakage from the transformer 400. A protective cover 460 may be provided over the feed-through assembly (feed-through connector 440 permanently connected to the feed-through plate 460) to protect the connectors from the elements.

While only a single winding 410 is illustrated, the transformer 400 may have multiple phases with multiple windings per phase (e.g., 3 phases, 2 windings per phase). The temperature of each of the windings 410 may be measured in one or more locations. Accordingly, multiple fiber optic cables 430 may be run from the optical temperature sensor/transmitter 422 to feed-through connectors 440 and multiple fiber optic cables 450 may be run from the feed-through connectors 440 to the windings 410.

Figure 5A:
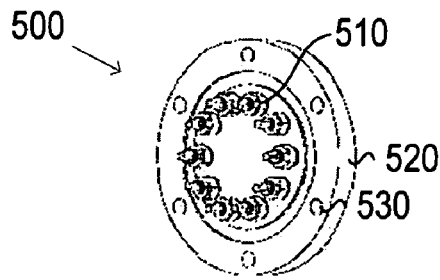
FIGS. 5A-B illustrate an example feed-through connecter plate, according to one embodiment.

FIG. 5A illustrates a perspective view of an example of a feed-through assembly 500. The feed-through assembly 500 includes feed-through connectors 510 (e.g., 440 of FIG. 4) permanently connected (e.g., welded) to a feed-through plate 520 (e.g., 460 of FIG. 4). The feed-through plate 520 may include holes 530 for bolting the plate 520 to a transformer. The plate 520 is illustrated as a circular plate but is not limited thereto.

Figure 5B:
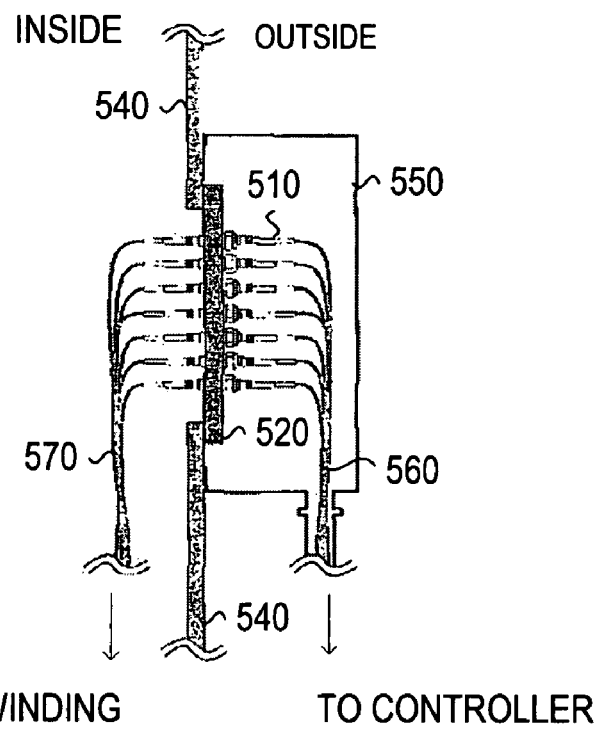

FIG. 5B illustrates a side view of an example feed-through assembly 500 mounted to a transformer 540. The transformer 540 includes an opening that is smaller than the plate 520. The plate 520 is mounted (e.g., bolted, welded) to the transformer 540 so as to fully close the opening. A protective cover 550 (e.g., 470) may be placed over the feed-through assembly 500. Extension fiber optic cables 560 (e.g., 430) run externally from the connectors 510 to an optical temperature sensor/transmitter (e.g., 422) while fiber optic cables 570 (e.g., 450) run internally from the connectors 510 to temperature probes in the windings.

Figure 6A:
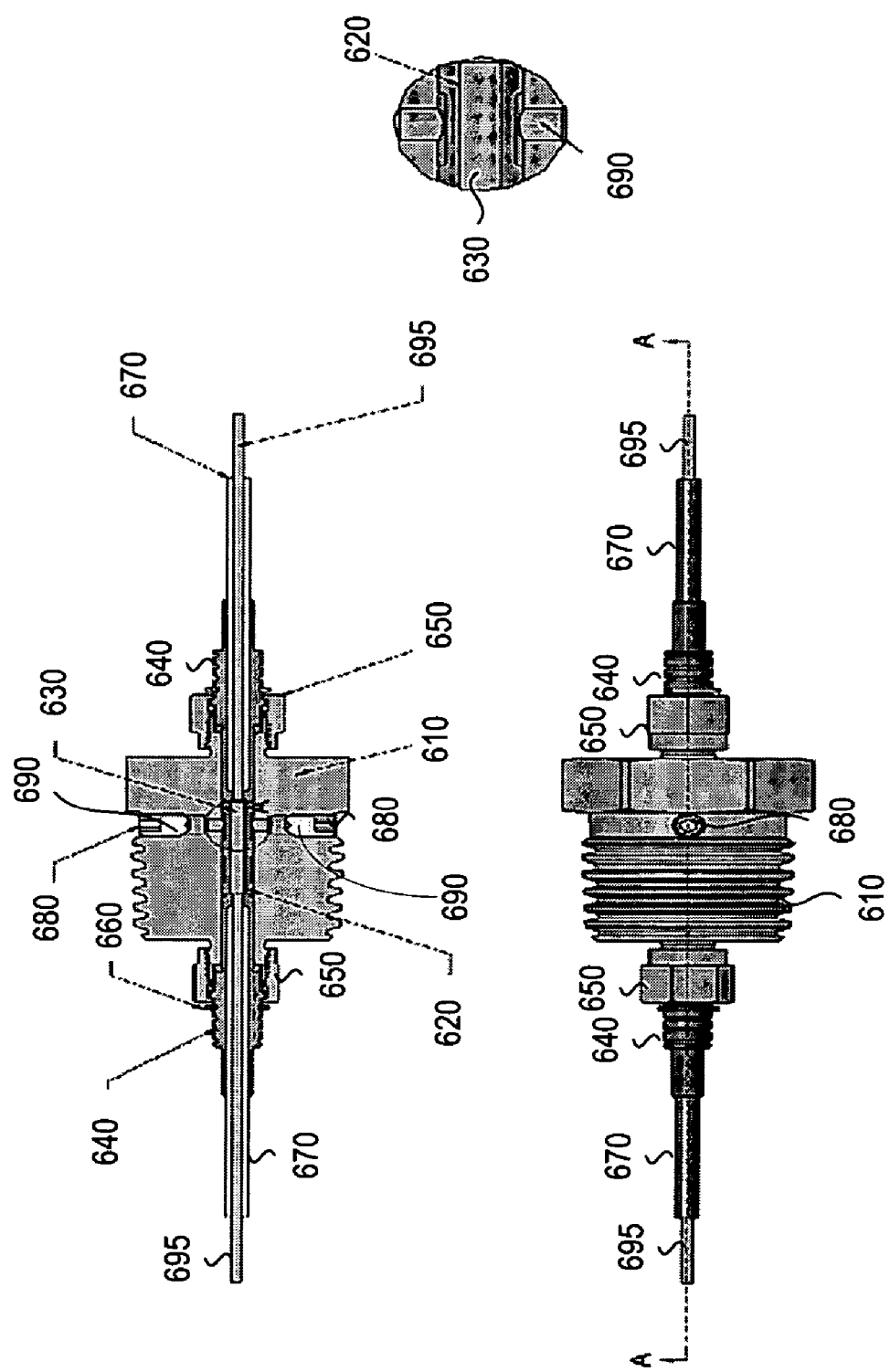
FIGS. 6A-B illustrate an example feed-through connecter, according to one embodiment.
Figure 6B:
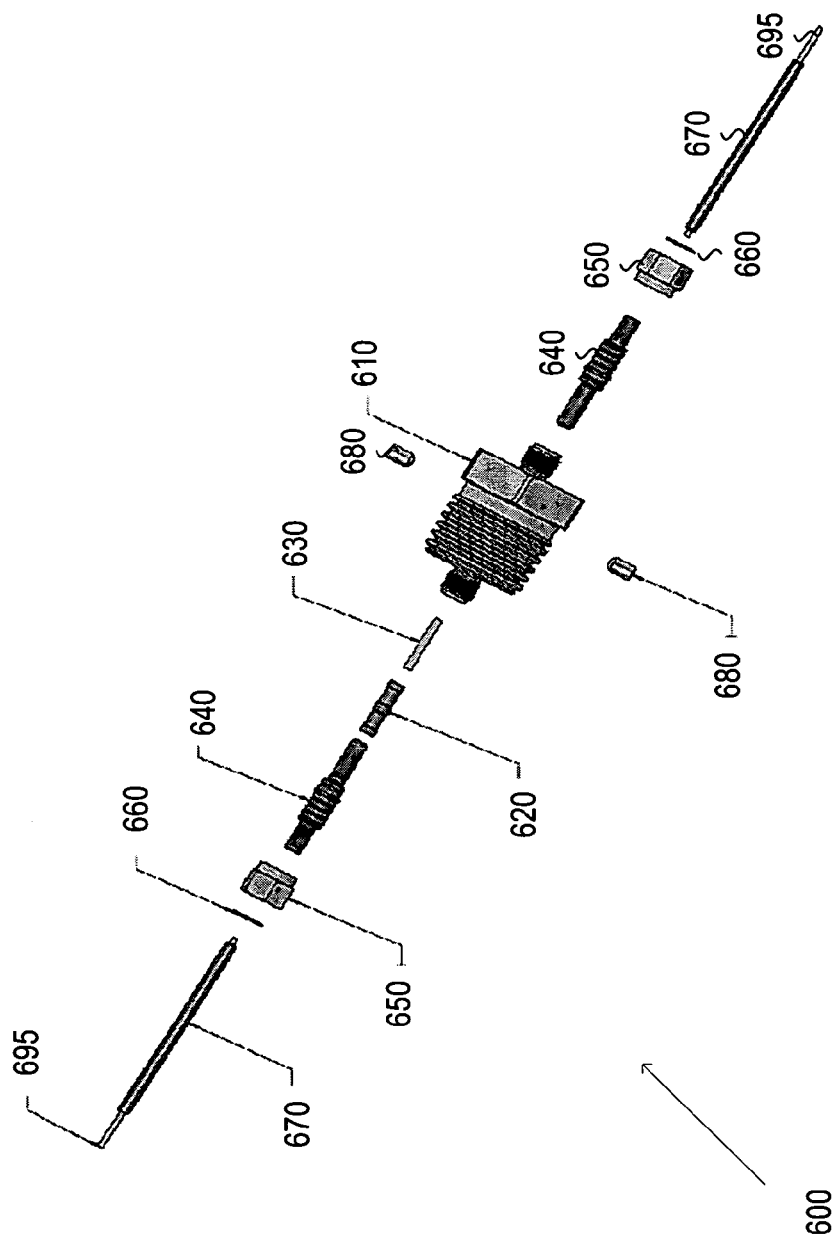

FIGS. 6A-B illustrate several views of an example feed-through connector 600 (e.g., 510 of FIG. 5). The connector 600 includes a potted feed-through 610, a fiber stub sleeve 620, a fiber stub 630, fiber connector ends 640, locknuts 650, SMA connectors 660, fiber jackets 670, and set screws 680. The fiber stub 630 fits within the fiber stub sleeve 620 and both are within the potted feed-through 610. According to one embodiment, the fiber stub 630 and the fiber stub sleeve 620 are bonded together prior to assembly. Fiber optic cables 695 are inserted into each side of the connector 600 and met within the fiber stub 630. The potted feed-through includes holes 690 formed therein that allow the set screws 680 to be inserted therein. The set screws may compress the fiber stub sleeve 620 and the fiber stub 630 and hold the fibers 695 together. According to one embodiment, epoxy is inserted in the holes 690 (to hold the fibers 695 together) prior to inserting the set screws 680.

Figure 7A:
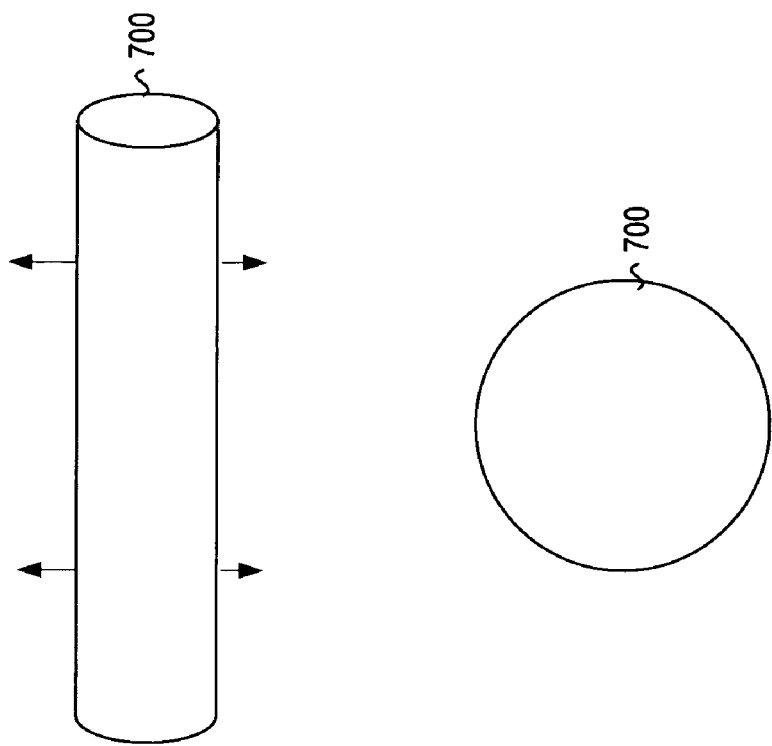
FIGS. 7A-B illustrate various example fiber optic cables, according to one embodiment.

FIG. 7A illustrates several views a single fiber optic cable 700 that may be used to transmit optical signals between optical temperature sensor/transmitters and temperature probes in the windings. The fiber optic cable 700 includes a core, cladding and a buffer layer (not illustrated). As one of ordinary skill in the art knows, the core is the layer (e.g., glass) used to transmit light, the cladding provides internal reflection, and the buffer provides protection to the fiber 700. The core of the cable 700 has a radius large enough to transmit the required amount of light therethough. However, the radius of the single fiber 700 may limit the flexibility of the cable and limit the bending radius of the cable (have a larger bending radius). Moreover, should the single fiber 700 break for any reason the light will not be transmitted and the probe will not be operational.

Figure 7B:
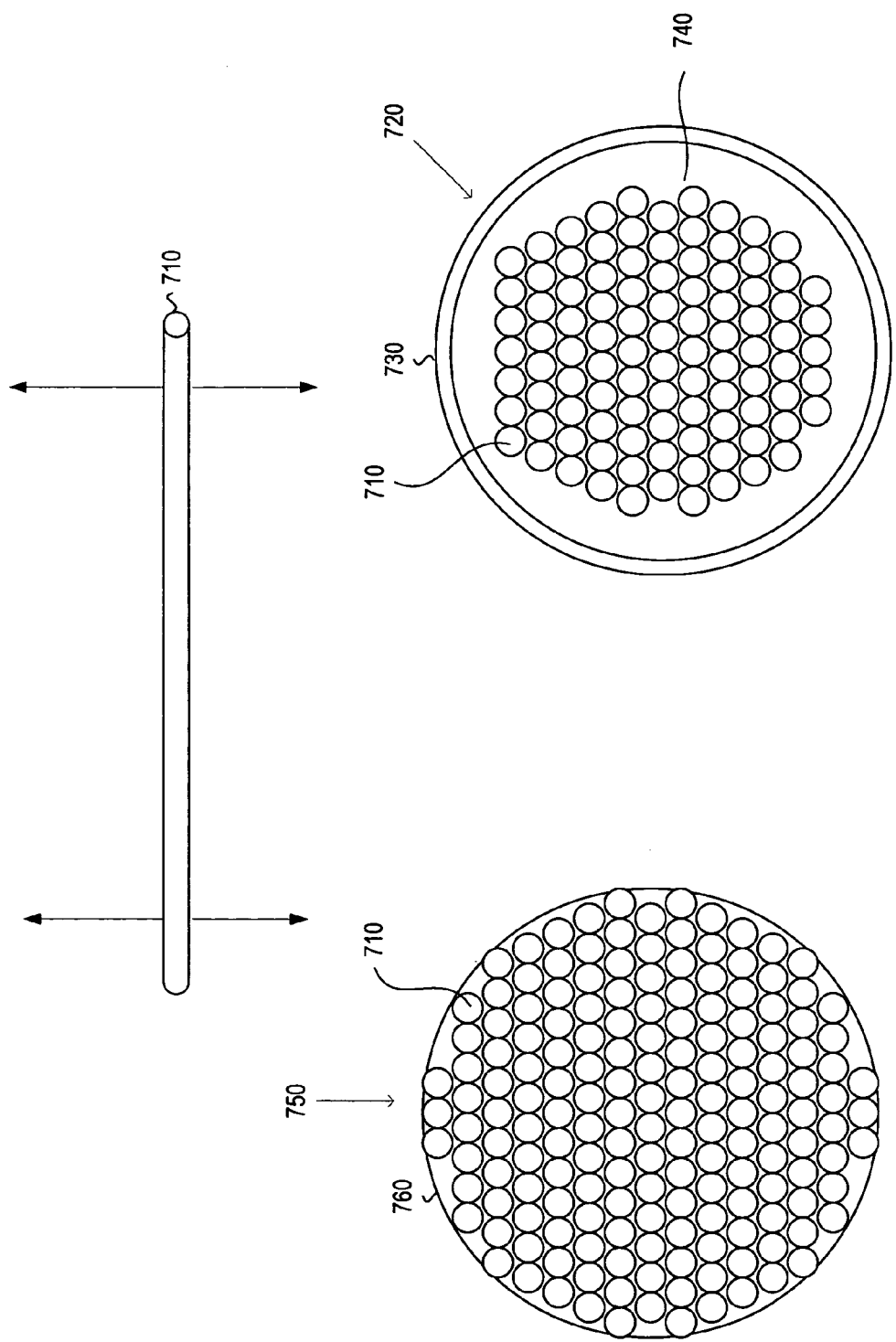

FIG. 7B illustrates several views a bundled fiber optic cables that may be used to transmit optical signals between optical temperature sensor/transmitters and temperature probes in the windings. A bundled fiber optic cable is a cable that is comprised of multiple individual fiber optic cables 710. Each of the individual fiber optic cables 710 has a small radius that provides for more flexibility and allows a smaller bending radius. Each of the fiber optic cables 710 may not in and of itself be able to transmit sufficient light. The individual cables 710 may be bound together at the ends and encased in some type of protective sleeve between the ends bundled together. Using a bundle of fiber optic cables 710 provide for redundancy in that if only a portion of the fiber optic cables 710 are damaged or destroyed the remaining cables 710 within the bundle can still be used to provide sufficient light transmission.

According to one embodiment, a bundled fiber optic cable 720 includes a plurality of cables 710. The plurality of cables 710 may be provided in a rigid tube 730 with the bundle being surrounded by a substance (e.g., oil) 740 to prevent the fibers 710 from rubbing against the rigid tube 730. This embodiment provides protection against the fiber optic cables 710 being damaged. However, using a rigid body 730 may limit the flexibility of the bundled fiber optic cable 720 and require a larger bending radius.

According to another embodiment, a bundled fiber optic cable 750 includes a plurality of cables 710. The plurality of cables 710 may be rather large (e.g., hundreds of cables) with the bundle surrounded by a sheath 760. The sheath 760 may enable the individual fibers 710 within the bundle 750 freedom to move about and accordingly provide the bundle 750 with flexibility and bending radius similar to that of the individual fibers 710 making up the bundle 750. With regard to redundancy it may be possible for a large percentage of the fibers to be degraded or non-operational (e.g., 80 percent) and to still have enough light being transmitted for the probe work for its intended purpose of measuring the temperature in the windings. The bundle of fibers surrounded by the sheath may be the preferred embodiment due to all the benefits provided.

Figure 8A:
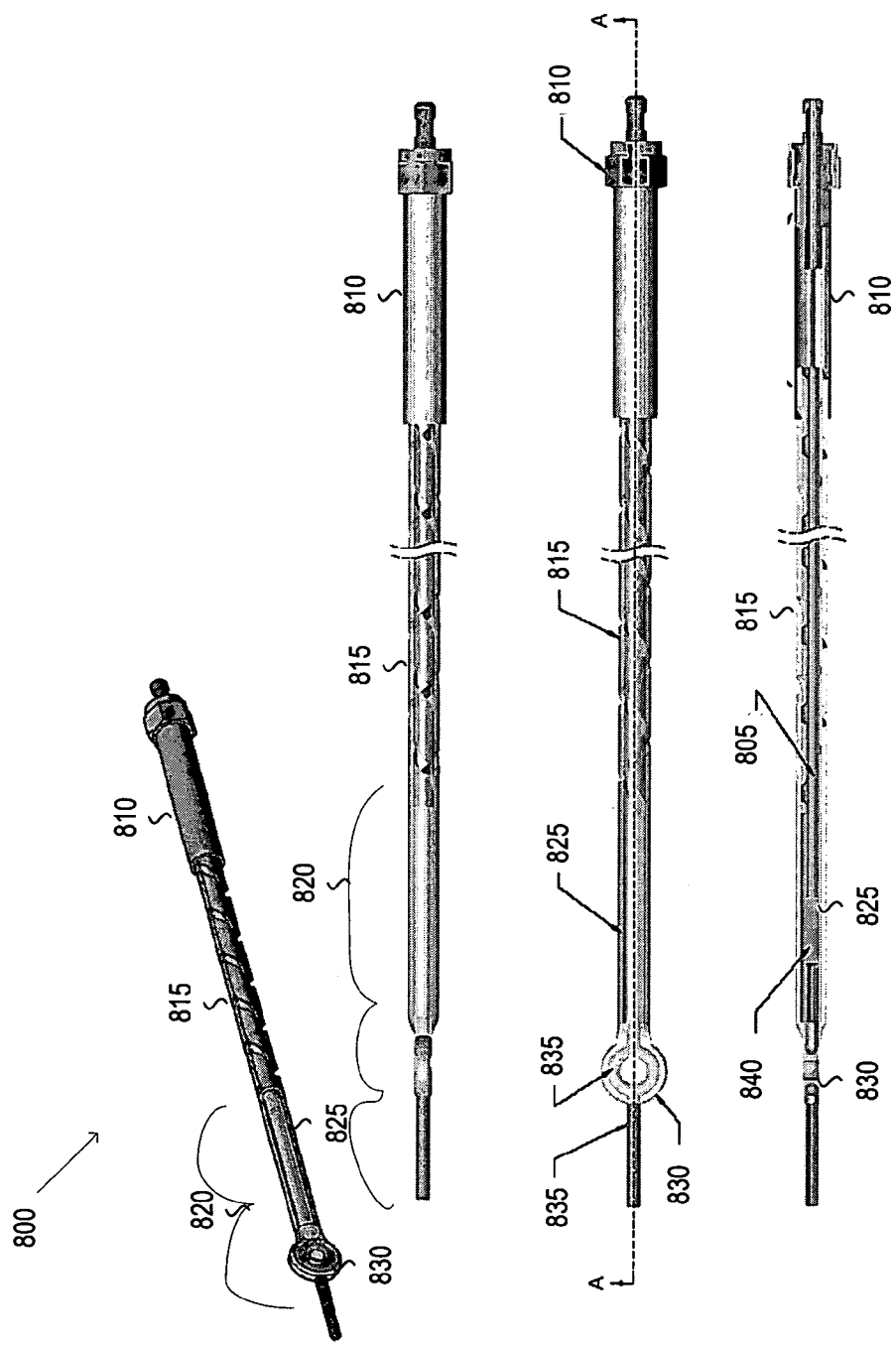
FIGS. 8A-B illustrate several example optical probes, according to one embodiment.

FIG. 8A illustrates several views of an example fiber optic probe cable 800. The probe cable 800 includes a multi-fiber bundle (e.g., 750) 805 running from a connector 810, through a spiral tube (e.g., double spiral tube) 815, and into a probe 820. The connector 810 is used for connecting the probe cable to an external fiber optic cable (e.g., 430) via a feed-through connector (e.g., 510, 600) mounted to a transformer. The spiral tube 815 holds the multi-fiber bundle 805 as it traverses through the transformer from the feed-through connector to the winding. The spiral tube 815 may provide the multi-fiber bundle 805 with flexibility and bending radius similar to that of the individual fibers making up the bundle 805. The probe 820 may include a crimp tube 825 where the end of the tube 825 is crimped to form a connection means 830 (illustrated as doughnut shaped). The connection means 830 may include a sleeve 835 (e.g., Kevlar) therewithin to provide support for the connection means 830. The excess sleeve 835 may extend out the opposite side of the connection means 830. A sensor 840 is located within the probe 820 for measuring temperature of the windings. The operation of the sensor 840 will be discussed in more detail later.

Figure 8B:
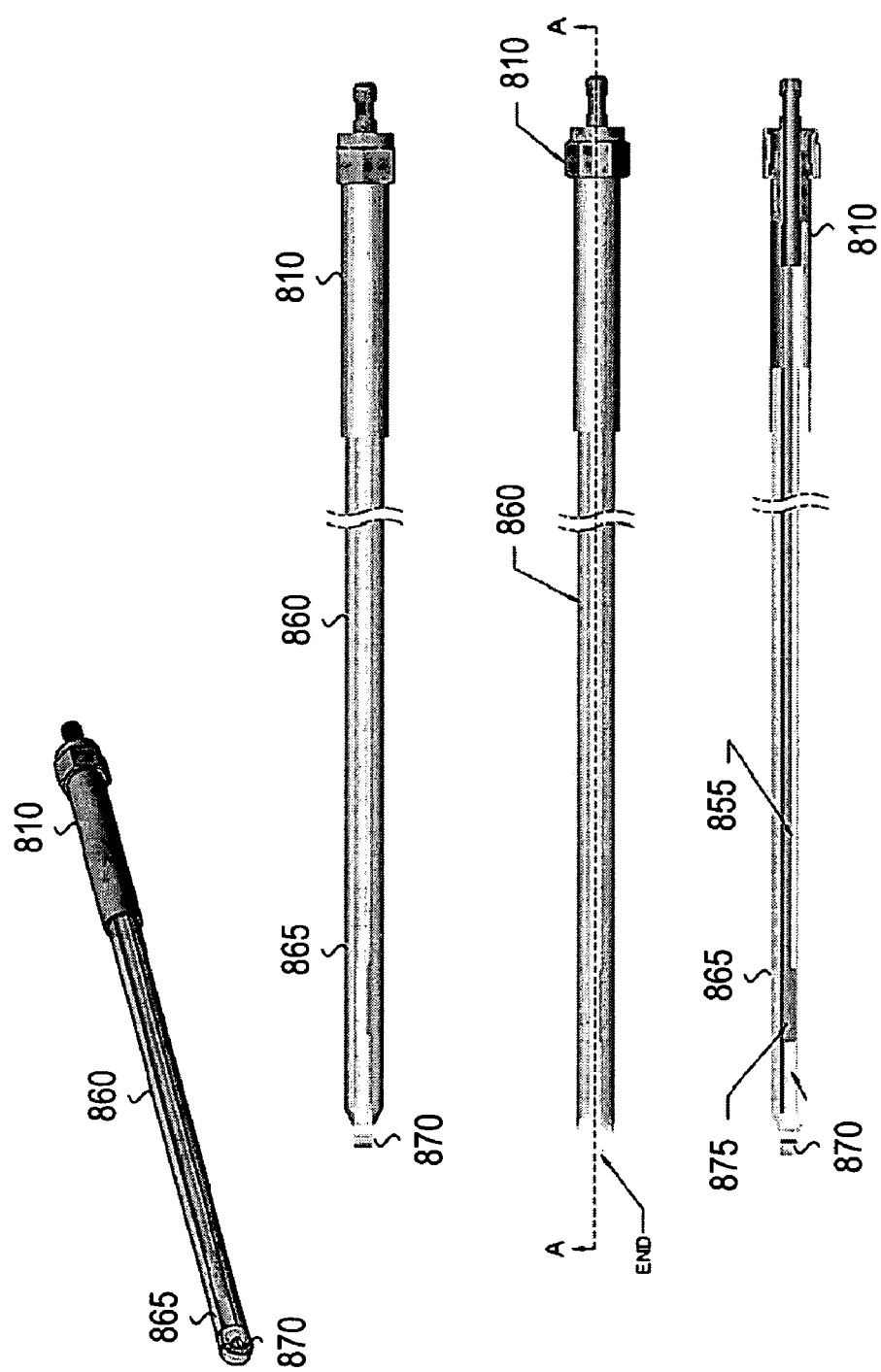

FIG. 8B illustrates several views of an example fiber optic probe cable 850. The probe cable 850 includes a multi-fiber bundle (e.g., 720) 855 running from the connector 810, through a rigid tube 860, and into a probe 865. The rigid tube 860 provides protection for the multi-fiber bundle 855 as it traverses through the transformer from the feed-through connector to the winding. The rigid tube 860 may be oil filled with the oil holding all of the fibers in the bundle 855 together. The probe 865 may be formed from the rigid tube 860 where the end of the probe 865 includes a connection means 870 (illustrated as a feed-through hole). The sensor 840 is located within the probe 865 for measuring temperature of the windings.

A fiber optic probe can be used to measure temperature by transmitting light to a sensor in the probe and measuring details about the reflections that are returned. Fiber optic probes are non-conducting (non-metallic and electrically inert) so they may eliminate the problems associated with metallic sensors (e.g., noise, shorts, heat conduction).

According to one embodiment, the sensor within the probe includes a semiconductor crystal (e.g., GaAs (gallium arsenide)) that absorbs different wavelengths of light based on temperature. As the temperature increases the wavelengths of light that are not absorbed by the crystal increase.

Figure 9A:
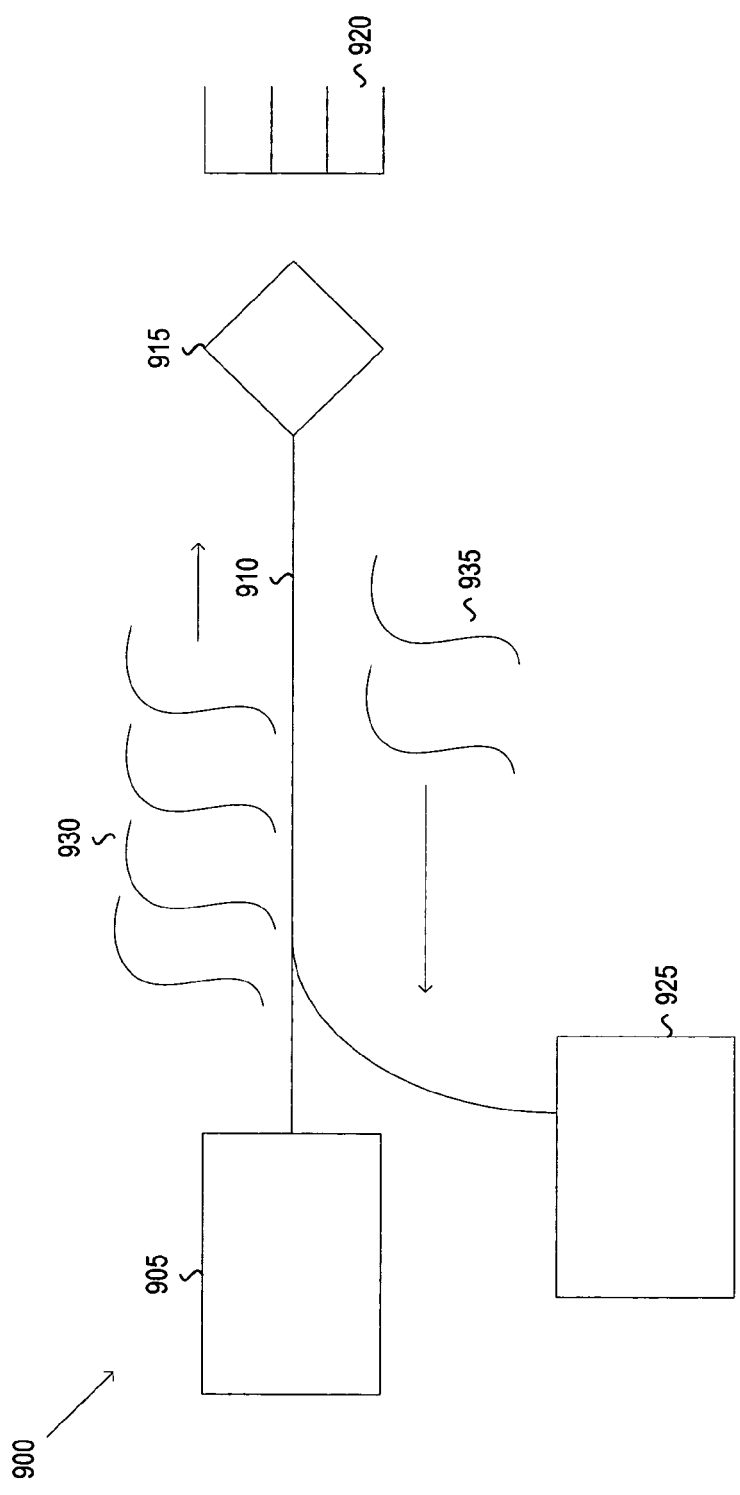
FIG. 9A illustrates an example GaAs fiber optic temperature measurement system, according to one embodiment.

FIG. 9A illustrates a schematic of an example fiber optic temperature measurement system 900. The system 900 includes a light source 905 (e.g., a white broadband light source), a fiber optic cable 910, a crystal (e.g., GaAs) 915, a mirror 920, and a spectrometer 925. The light source 905 may generate and transmit many individual wavelengths of light 930. The crystal 915 absorbs a portion of the wavelengths of light. The wavelength of light that is not absorbed is based on the temperature of the crystal 915 (which correlates to the temperature of the winding that the probe is embedded in). The mirror 920 reflects the non-absorbed wavelengths of light 935 that is transmitted back through the fiber 910 and is received by the spectrometer 925. The spectrometer 925 determines the absorption cut-off wavelength and determines the temperature based thereon. As illustrated four different wavelengths of light 930 are transmitted from the light source 905 and two different wavelengths of light 935 pass through the crystal 915 and are reflected by the mirror 920 and transmitted back up the fiber 910 to the spectrometer 925.

Figure 9B:
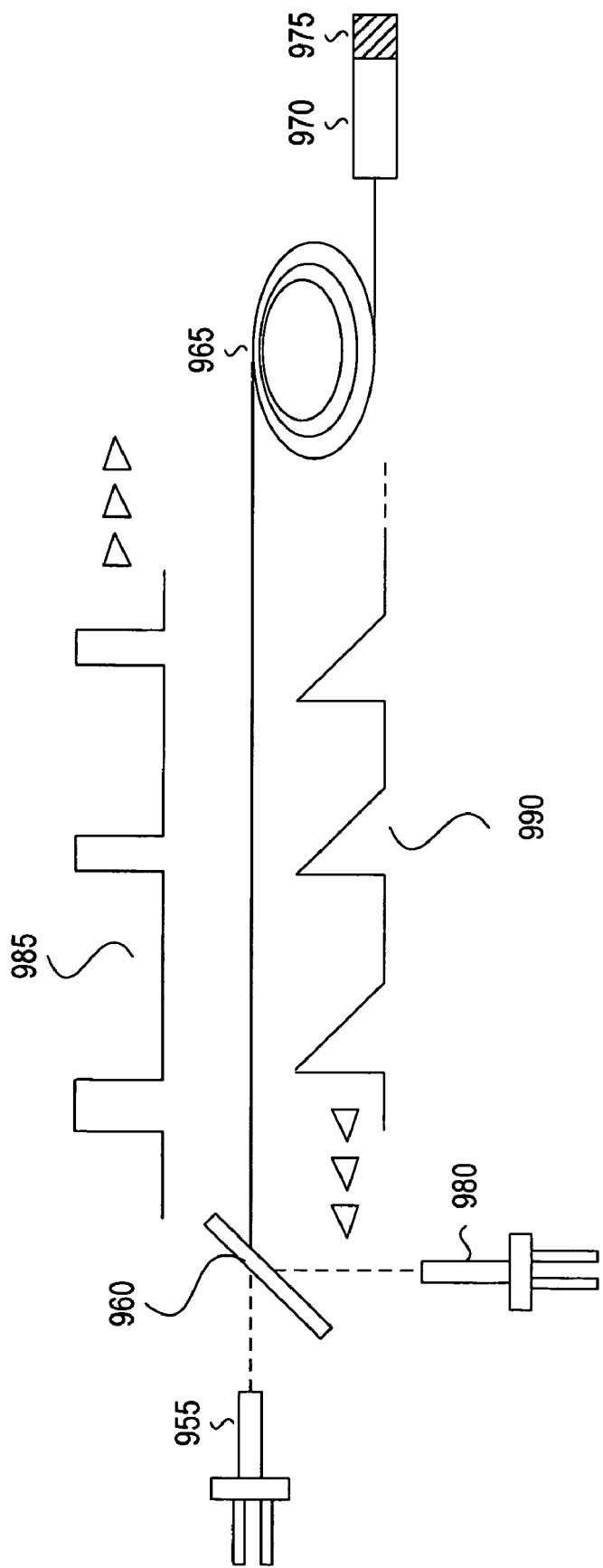
FIG. 9B illustrates an example phosphorous fiber optic temperature measurement system, according to one embodiment.

FIG. 9B illustrates a schematic of an example fiber optic temperature measurement system 950. The system 950 includes a light source 955, a filter/mirror (color separating) 960, an optical fiber (e.g., bundled fiber) 965, a probe 970 having a phosphor material bonded to tip of the probe (phosphorous sensor) 975 and a photo detector 980. The light source 955 transmits a plurality of light pulses 985 through the fiber 965. The light pulses 985 excite the phosphorous sensor 975 causing it to emit a different color (red fluorescent) 990. The persistence of the afterglow 990 depends on the temperature of the phosphor (the higher the temperature the shorter the after glow). The afterglow 990 is transmitted up the fiber 965 and is reflected onto the detector 980 by the color separating mirror 960. The detector 980 converts the optical signals returned (the afterglow) 990 into an electrical signal associated therewith. The electrical signal may be provided to a controller (e.g., 424) to determine the associated temperature.

The light source 955 may be any light source that is capable of providing pulsed light signals. For example, the light source 955 could be a laser, a halogen light (flash lamp) or a long life light emitting diode (LED). The LED may be the preferred embodiment due to its long life expectancy and the fact that no calibration is required. According to one embodiment, a blue LED such as that which is provided in standard, off-the-shelf products available from Ocean Optics, Photon Controls, or other manufacturers, may be used. However, the LED is not limited to a blue LED. Rather, as one skilled in the art will recognize a green LED such as that which is available from other manufacturers may be used or alternate colors (e.g., blue-green) may be used.

As discussed above the electrical signal generated from the fiber optic temperature probe system can be provided to a controller to convert to a temperature. The controller may display and record the temperature that is determined and may also sound alarms, perform analysis, and possible take actions based on the temperature detected in the windings. The controller may also be capable of receiving different transformer parameters that are measured and/or calculated. For example, the controller may receive data regarding the ambient temperature, load current at the bushings, oil temperature above the windings (top oil), load tap control, pressure, oil temperature below the windings (bottom oil), cooling status and cooling control. The controller may analyze all of the various inputs in order to provide additional parameters and statistics that may be used for maintenance, operation and loading of the transformer.

Figure 10:
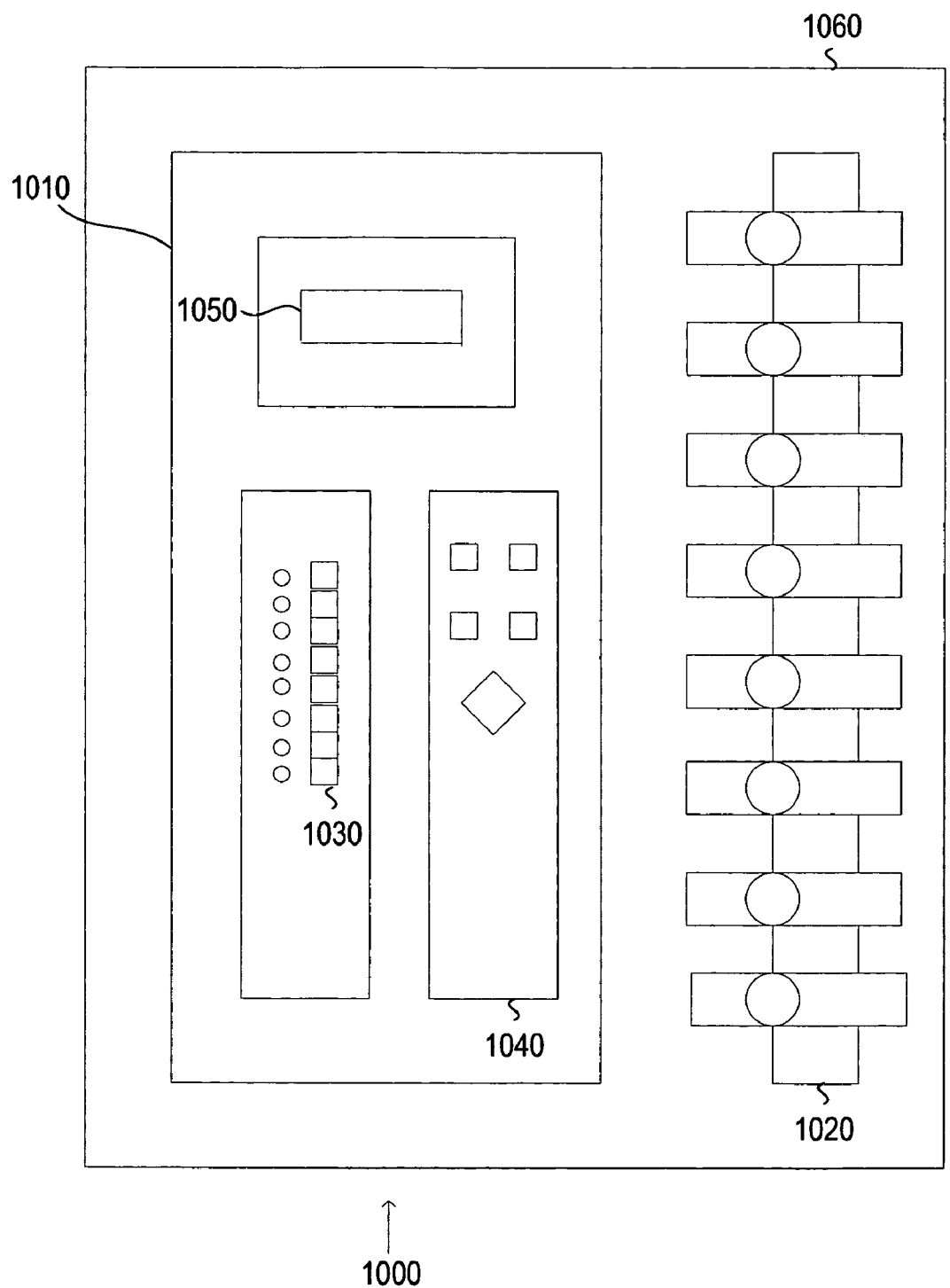
FIG. 10 illustrates an example controller, according to one embodiment.

FIG. 10 illustrates an example controller unit 1000 for monitoring and controlling the temperature and other features of the transformer. The embodiment illustrated includes a controller 1010 and a plurality of optical converters 1020. The controller 1010 includes a plurality of connections 1030 for receiving various parameters such as those illustrated in and discussed with reference to FIG. 3. The plurality of optical converters 1020 provide light to the fiber optic cables (e.g., bundles) and convert the light received back to from the probe to an electrical signal. The controller 1010 may also include some adjustments 1040 to switch between readings, etc. The controller 1000 may also include a display 1050 for reading data. According to one embodiment, the controller 1010 may also maintain a log of the readings and/or analysis s that it can look for trends or can review data leading up to a certain condition occurring that may provide details as to what happened.

According to one embodiment, the components of the controller unit 1000 would be located in a standard size electronic equipment box, rack and/or chassis (housing) 1060. As illustrated, the controller unit 1000 includes the optical converters 1020 placed to the side (right) of the controller 1010 as they sit in the housing 1060. The controller unit 1000 is in no way intended to be limited thereby. Rather, the controller unit 1000 could have the optical converters 1020 located on the bottom of (on top of, to the left of) the controller 1010 within the housing 1060. According to one embodiment, the optical converters 1020 may be located in one housing and the controller 1010 may be contained in another housing so that standard size housings can be used and the optical converters 1020 can be retrofitted to systems that already have a controller 1010 without the need for replacing the controller 1010 or at least relocating the controller 1010 into a new housing with the optical converters 1020.

If the controller 1000 includes both simulated and direct winding data associated with the temperature of the transformer, additional analysis may be performed (see FIGS. 11A-D). For example, in typical operation of a transformer it may take four hours for the top and bottom oil to heat up to the temperature of the windings. If the time it takes the oil to heat up reduces to a certain point it may be an indication that the insulation system of the transformer is degrading or some other problem is occurring.

Figure 11A:
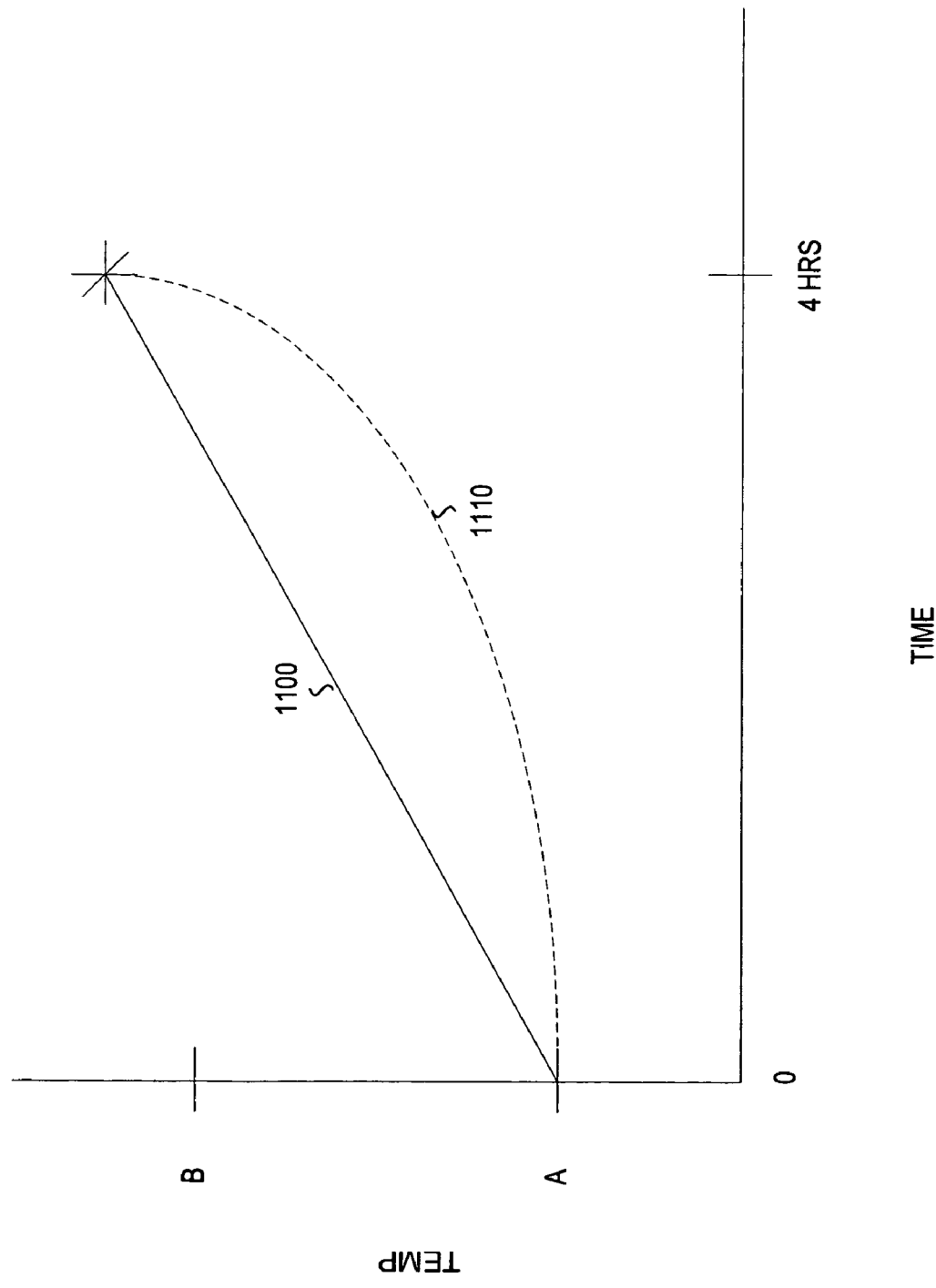
FIGS. 11A-D illustrates example graphs of direct winding temperature versus simulated winding temperature, according to one embodiment.

FIG. 11A illustrates an example graph of changes in direct winding temperature 1100 and simulated winding temperature 1110 during a temperature gradient (increase) in the transformer. As the temperature of the winding increase from A to B over time it takes the simulated temperature 1110 much longer to reflect the change. As illustrated, after four hours the simulated temperature 1110 catches up to the direct winding temperature 1100. As illustrated, the direct winding temperature 1100 and the simulated winding temperature 1110 are the same at points A and B. However, as previously discussed it is likely that the temperatures are not the same as the direct winding temperature 1100 is more accurate than the simulated winding temperature 1110. Accordingly, the simulated temperature 1110 may be above or below the direct winding temperature 1100 at these points. This graph may represent the typical operation of the transformer if the direct winding temperature is actually at the hottest spot of the transformer.

Figure 11B:
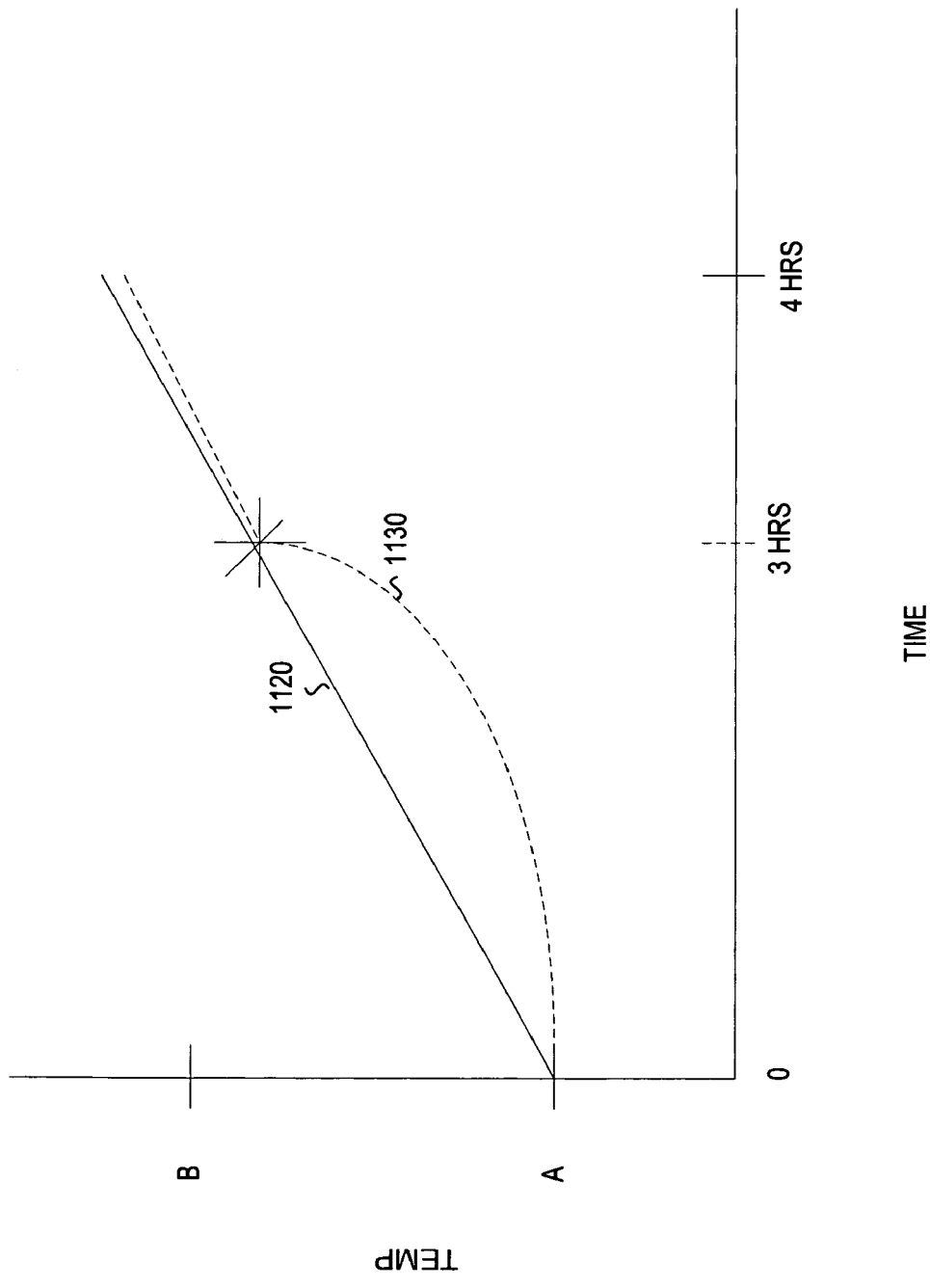

FIG. 11B illustrates an example graph of changes in direct winding temperature 1120 and simulated winding temperature 1130 during a temperature gradient (increase) in the transformer. As the temperature of the winding increase from A to B over time, it takes the simulated temperature 1130 less time to reach the direct winding temperature 1120 then the example illustrated in FIG. 11A. This graph may indicate that the probe measuring direct winding temperature 1120 is not located at the hot spot and there is some kind of heat generating fault.

Figure 11C:
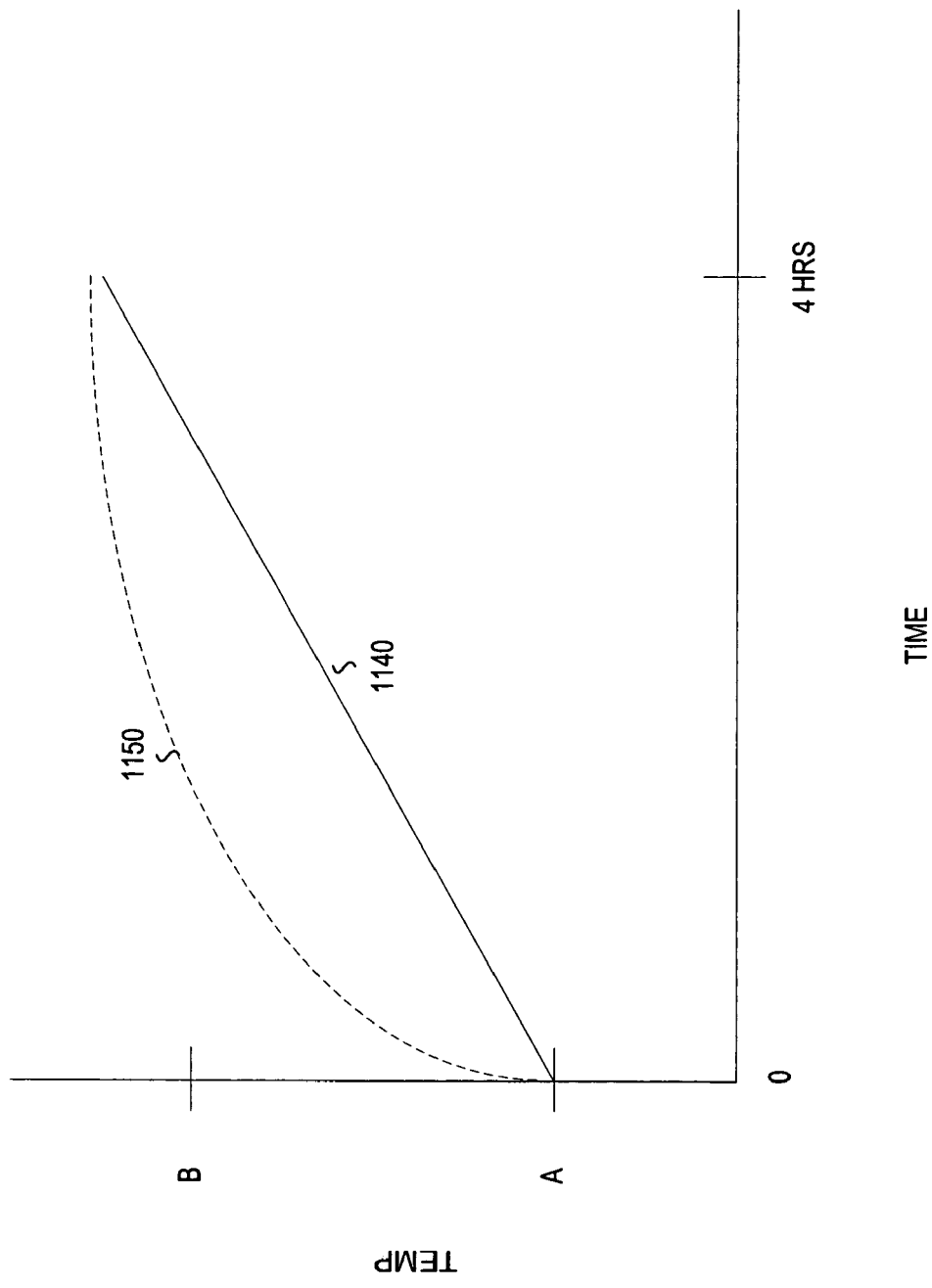

FIG. 11C illustrates an example graph of changes in direct winding temperature 1140 and simulated winding temperature 1150 during a temperature gradient (increase) in the transformer. As the temperature of the winding increase from A to B over time, the simulated temperature 1150 records the increases in temperature sooner than the direct winding temperature 1140. This graph may indicate that the probe measuring direct winding temperature 1150 is not located at the hot spot and there is some kind of heat generating fault in the transformer.

Figure 11D:
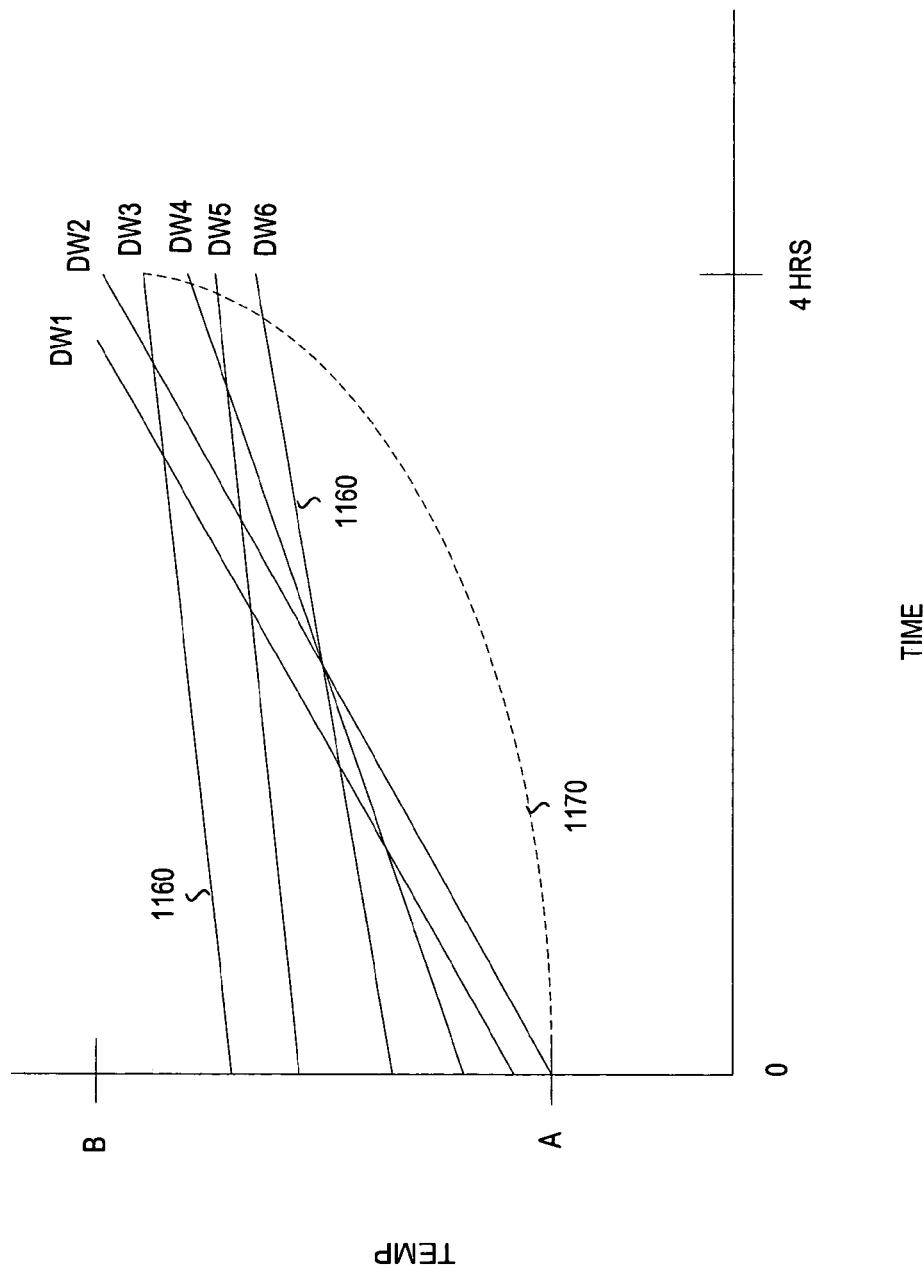

FIG. 11D illustrates an example graph of multiple direct winding temperatures 1160 and a simulated winding temperature. Being able the analyze the different direct winding temperatures versus the simulated temperature over time enables a user to better detect the hot spot of the transformer and accordingly base maintenance, operations and loading decisions based on the hot spot.

The many features and advantages of the various embodiments are apparent from the detailed specification. Thus, the appended claims are intended to cover all such features and advantages of the various embodiments that fall within the true spirit and scope of the various embodiments. Furthermore, since numerous modifications and variations will readily occur to those skilled in the art, it is not desired to limit the various embodiments to the exact construction and operation illustrated and described. Accordingly, all appropriate modifications and equivalents may be included within the scope of the various embodiments.

Although the various embodiments have been illustrated by reference to specific embodiments, it will be apparent to those skilled in the art that various changes and modifications may be made which clearly fall within the scope. The embodiments are intended to be protected broadly within the spirit and scope of the appended claims.

What is claimed:

1. An apparatus to monitor the temperature of a transformer, the apparatus comprising:

a fiber optic cable having a temperature sensing probe on one end, wherein the probe is embedded in windings of a transformer;

an optical converter to transmit light to the probe via the fiber optic cable, to receive light from the probe via the fiber optic cable, and to convert the light received to an electrical signal, wherein the light received back from the probe is controlled by temperature of the probe;

monitors to monitor different parameters of the transformer; and a controller to receive data from said monitors and the electrical signal from said optical converter, wherein the controller generates a simulated winding temperature based on data from the monitors, wherein the controller converts the electrical signal to a direct winding temperature, and wherein the controller analyzes the operation of the transformer by comparing the direct winding temperature to the simulated winding temperature.

2. The apparatus of claim 1, wherein the fiber optic cable is a bundled fiber optic cable.

3. The apparatus of claim 1, wherein the probe includes a phosphorous tip that emits an afterglow when excited.

4. The apparatus of claim 3, wherein the afterglow is a red fluorescent.

5. The apparatus of claim 3, wherein persistence of the afterglow is based on temperature.

6. The apparatus of claim 5, wherein said optical converter includes a photodetcor to receive the afterglow and generate an electrical signal indicative of temperature based thereon.

7. The apparatus of claim 1, wherein said optical converter includes a broadband light source.

8. The apparatus of claim 1, wherein said optical converter includes an LED.

9. The apparatus of claim 8, wherein the LED is a blue LED.

10. The apparatus of claim 1, wherein the monitored data includes top oil temperature.

11. The apparatus of claim 1, wherein the monitored data includes non-temperature data and the controller also analyzes, reports, and records non-temperature parameters.

12. A method to monitor the temperature of a transformer, the method comprising:

transmitting light from an optical converter through a fiber optic cable having a probe on one end that is attached to windings of a transformer;

receiving light back from the probe, wherein the light received back from the probe is controlled by temperature of the probe;

converting the light received from the probe to an electrical signal;

converting the electrical signal into a direct winding temperature;

monitoring different parameters of the transformer;

generating a simulated winding temperature from the monitored parameters; and analyzing the performance of the transformer by comparing the simulated winding temperature to the direct winding temperature.

13. The method of claim 12, wherein said transmitting light includes transmitting light from an LED.

14. The method of claim 12, wherein said transmitting light includes transmitting light via a bundled fiber optic cable.

15. The method of claim 12, wherein said receiving light back includes receiving a fluorescent afterglow from the probe, wherein the afterglow is generated by a phosphorus tip in the probe when excited by the light transmitted from the optical converter, and wherein persistence of the afterglow is based on temperature.

16. The method of claim 12, wherein said monitoring includes monitoring top oil temperature.

17. The method of claim 12, further comprising receiving and processing measurements of various other parameters of the transformer.

18. A transformer comprising
bushings to receive a voltage from transmission lines;
windings to convert the voltage received;
a fiber optic temperature-sensing cable having a phosphorus sensor probe embedded in said windings;
an LED to transmit light pulses to the phosphorus sensor probe, wherein the phosphorus sensor probe emits a fluorescent afterglow when excited by the light pulses, and wherein persistence of the afterglow is based on temperature;
a photodetector to receive the afterglow from the probe and to convert the afterglow to an electrical signal;
monitors to monitor different parameters of the transformer; and
a controller to receive data from said monitors and the electrical signal from said optical converter, wherein the controller generates a simulated winding temperature based on data from the monitors, wherein the controller converts the electrical signal to a direct winding temperature, and wherein the controller analyzes the operation of the transformer by comparing the direct winding temperature to the simulated winding temperature.

19. The transformer of claim 18, wherein said fiber optic temperature-sensing cable is a bundled fiber cable.

20. The transformer of claim 18, further comprising a feed-through plate having a feed-through connector mounted thereto and a bundled fiber optic extension cable, wherein the feed-through plate is mounted to the transformer and connects the bundled fiber optic temperature-sensing cable inside the transformer to the bundled fiber optic extension cable outside the transformer, wherein the feed-through plate provides a leak free connection.

* * * * *